United States Patent
Itoh

(10) Patent No.: US 7,917,905 B2
(45) Date of Patent: Mar. 29, 2011

(54) PROCESS CONTROL SYSTEM AND CONTROL METHOD THEREFOR

(75) Inventor: Hiroshi Itoh, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1303 days.

(21) Appl. No.: 11/480,716

(22) Filed: Jul. 3, 2006

(65) Prior Publication Data

US 2007/0011661 A1 Jan. 11, 2007

(30) Foreign Application Priority Data

Jul. 7, 2005 (JP) .................................. 2005-199309

(51) Int. Cl.
*G06F 9/46* (2006.01)
(52) U.S. Cl. ....................................................... 718/102
(58) Field of Classification Search ................... 718/102
See application file for complete search history.

(56) References Cited

U.S. PATENT DOCUMENTS

| 6,192,514 | B1 * | 2/2001 | Lurndal .......................... 717/149 |
| 2002/0087611 | A1 * | 7/2002 | Tanaka et al. ...................... 709/1 |
| 2003/0126184 | A1 * | 7/2003 | Austin ........................... 709/105 |
| 2003/0196136 | A1 * | 10/2003 | Haynes et al. ................... 714/13 |
| 2005/0235285 | A1 * | 10/2005 | Monasterio .................... 718/100 |
| 2006/0010101 | A1 * | 1/2006 | Suzuki et al. ...................... 707/2 |

FOREIGN PATENT DOCUMENTS

| JP | 11-065859 | 3/1999 |
| JP | 2000-284976 | 10/2000 |

* cited by examiner

*Primary Examiner* — Li B Zhen
*Assistant Examiner* — Blake Kumabe
(74) *Attorney, Agent, or Firm* — John L. Rogitz

(57) ABSTRACT

A process control system has a process state detection unit 10 that detects activation of a predetermined process in a computer and determines whether the process is a previously determined one of control-target processes, a comparison unit 30 that, if the process state detection unit 10 determines that the control-target process is activated, acquires the CPU usage rate of the entire system and compares the acquired CPU usage rate with a previously determined target value of the CPU usage rate of the entire system, and a process suspension control unit 40 that controls suspension and resumption of the control-target process based on the result of comparison by the comparison unit 30.

14 Claims, 8 Drawing Sheets

PROCESS CONTROL SYSTEM AND CONTROL METHOD THEREFOR

RELATED APPLICATION

This application claims priority from Japanese patent application serial no. 2005-199309, filed Jul. 7, 2005.

FIELD OF THE INVENTION

The present invention relates to control of the CPU usage rate (processor usage rate) in a computer. In particular, it relates to a system and a method for controlling the CPU usage rate of each process in the case where a plurality of programs run simultaneously.

BACKGROUND OF THE INVENTION

Typically, computer programs are designed to execute tasks in the shortest time. Operating systems (OS) are designed to make the best use of the processor capability. Thus, when a program is executed that requires a large amount of data calculation and comparison, the CPU usage rate increases to nearly 100%. If this occurs in a client machine, the response to user accesses at a human interface (input) device (HID) or the like may be delayed, or if this occurs in a server machine, the response to file accesses via a network may be delayed.

To prevent the delay of the response to unexpected external access requests to the CPU resources, the priority level of a thread (a series of tasks that operates independently) belonging to a program process in the task scheduler can be changed to the idle level (the lowest priority level). Alternatively, a program itself can pre-specify the execution priority level in detail to reduce the effect of the program on the CPU usage rate of the entire system. Yet again, the CPU usage rate of the entire system can be measured, and activation of a process then controlled to prevent the CPU usage rate from exceeding a predetermined upper limit.

As understood herein, however, all of these methods have drawbacks. For example, during execution of a program by a computer, it is preferred that the CPU usage rate is effectively controlled, and the delay of response to a user access or a file access is reduced, but simply changing the priority level of a thread, while permitting effective control if the data involved with the process is processed completely in a memory, facilitates less effective controlled if the process involves I/O access to a peripheral device (for example, a process that repeats data comparison and disk I/O, such as an antivirus program). This is because, in the latter case, the I/O waiting time is lengthened, and the task execution time of the main thread is substantially short, so that changing the task priority level of the thread to the idle level (the lowest priority level) does not have a significant effect on the CPU usage rate.

Furthermore, a program that executes a process that involves I/O access to a peripheral device typically repeats I/O accesses without taking into account the presence of other programs. Thus, for example, if a single device, such as a disk I/O, is successively accessed, delays occur in the disk I/Os for other programs and the disk I/O for memory swapping of the OS itself, so that the CPU usage rate is increased in a composite manner.

Still further, in the case where the task priority level of a main thread is changed to the idle level, if data that has not yet read remain in the main thread after completion of the I/O access, the I/O access from another process may not be accepted depending on the design of the OS. In this case, changing the task priority level to the idle level (the lowest priority level) itself can cause an increase of the CPU usage rate.

On the other hand, when the program itself specifies the execution priority level in detail, it is ensured that the effect of the program on the CPU usage rate of the entire system can be reduced. However, it cannot be expected that such an option is implemented on all the programs running on the OS. In addition, since such an option is designed only for the relevant program process, the CPU usage rate of the entire system cannot be controlled if even one program that does not have such an option is executed.

In addition, when the suspension time of a relevant process is calculated from the ratio between the CPU usage rate of the relevant process and the CPU usage rate of the entire system, and the process is suspended temporarily, there is a problem that the calculation of the suspension time takes a certain time, and it is difficult to quickly control the process in response to the actual activation thereof or actual execution state thereof.

With these critical observations in mind, the invention herein is provided.

SUMMARY OF THE INVENTION

To effectively and quickly control the CPU usage rate and reduce a delay of the response to a user access or a file access in process control of a computer, the present invention may be implemented as a process control system configured as described below or as a computer that includes the process control system and an OS execution unit. The process control system may include a process state detection unit, a comparison unit, and a process suspension control unit. The process state detection unit detects activation of a predetermined process under the control of the OS execution unit and determines whether the process is a previously determined control-target process. The comparison unit acquires the CPU usage rate of the entire system from the OS execution unit and compares the acquired CPU usage rate with a previously determined target value of the CPU usage rate of the entire system if the process state detection unit determines that the control-target process is activated. The process suspension control unit instructs the OS execution unit to suspend or resume the control-target process based on the result of comparison by the comparison unit.

More specifically, if the comparison unit determines that the current value of the CPU usage rate of the entire system is greater than the target value, the process suspension control unit suspends the control-target process. On the other hand, if the comparison unit determines that the current value is smaller than the target value, and the control-target process is suspended, the process suspension control unit resumes execution of the control-target process. Furthermore, an upper limit value and a lower limit value may be set as the target value of the CPU usage rate of the entire system, and the process suspension control unit may suspend the control-target process if the comparison unit determines that the current value of the CPU usage rate of the entire system is greater than the upper limit value, and resume execution of the control-target process if the comparison unit determines that the current value is smaller than the lower limit value and the control-target process is suspended.

More preferably, if the comparison unit determines that the current value of the CPU usage rate of the entire system is greater than the target value, and there are a plurality of control-target processes in operation, the comparison unit determines at least some of the control-target processes in operation as targets for suspension. Then, the process suspension control unit suspends the control-target processes in operation that are determined as targets for suspension by the comparison unit.

In addition, in the process control system described above, the comparison unit may calculate a prediction value of the CPU usage rate of the entire system by performing a multiple regression analysis on time-series data over a certain period of time about the CPU usage rate of the entire system and the CPU usage rate of each process and compare the prediction value with the target value. In this case, the process suspension control unit suspends the control-target process if the comparison unit determines that the prediction value is greater than the target value, and resumes execution of the control-target process if the comparison unit determines that the prediction value is smaller than the target value and the control-target process is suspended.

Furthermore, the process control system described above may be configured to have a control target modification unit that acquires the process-based CPU usage rate of each process in operation from the OS execution unit and modifies the control-target process based on the process-based CPU usage rate.

Specifically, the process control system may be configured as described below. That is, a control target process description file that describes a plurality of control-target processes can be prepared. The process state detection unit checks whether the process whose activation is detected is described in the control target process description file or not to determine whether the process is one of the control-target processes or not. The control target modification unit acquires the process-based CPU usage rate of each process in operation from the OS execution unit at regular intervals, for example, and checks whether a predetermined process identified based on the process-based CPU usage rate is described in the control target process description file or not. Then, if the predetermined process is not described in the control target process description file, the control target modification unit adds the predetermined process to the control target process description file.

Furthermore, the present invention may be implemented as a process control method described below. This method comprises detecting activation of a predetermined process in a computer and determining whether the process is a previously determined control-target process or not, acquiring the CPU usage rate of the entire system if the process state detection unit determines that the control-target process is activated, comparing the acquired CPU usage rate of the entire system with a previously determined target value of the CPU usage rate of the entire system, suspending the control-target process if the CPU usage rate of the entire system is greater than the target value, and resuming execution of the control-target process if the CPU usage rate of the entire system is smaller than the target value and the control-target process is suspended.

Furthermore, the present invention may be implemented as a program that controls a computer to perform each function of the process control system described above, or a program that makes a computer perform each processing in the process control method described above. The program can be distributed on a magnetic disk, an optical disk, a semiconductor memory or other recording medium or via a network.

According to the present invention configured as described above, the suspension and resumption of each process can be heuristically controlled without calculating the CPU usage rate, suspension time, execution time, priority level or the like of each process. Thus, the CPU usage rate can be effectively and quickly controlled, and a delay of the response to a user access or file access can be reduced.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

In the following, a best mode for carrying out the present invention (referred to as embodiment, hereinafter) will be described in detail with reference to the accompanying drawings.

First, the outline of the present invention will be described. According to a computer process control method according to the present invention, a target value of the CPU usage rate of the entire system and a process to be controlled (referred to as control-target process, hereinafter) are specified. As the control-target process, one or more processes that are considered to raise the CPU usage rate of the entire system are selected from among processes executed simultaneously.

Then, the CPU usage rate is monitored during actual operation of the computer, and if the CPU usage rate becomes higher than the target value, the control-target process or a thread thereof is suspended. If the actual CPU usage rate becomes lower than the target value, the suspended control-target process or the suspended thread is resumed.

In this way, according to the present invention, the execution time of each process (control-target process) is dynamically controlled based on the feedback of the CPU usage rate of the entire system, rather than on the CPU usage rate or priority level of each process.

Figure 1:
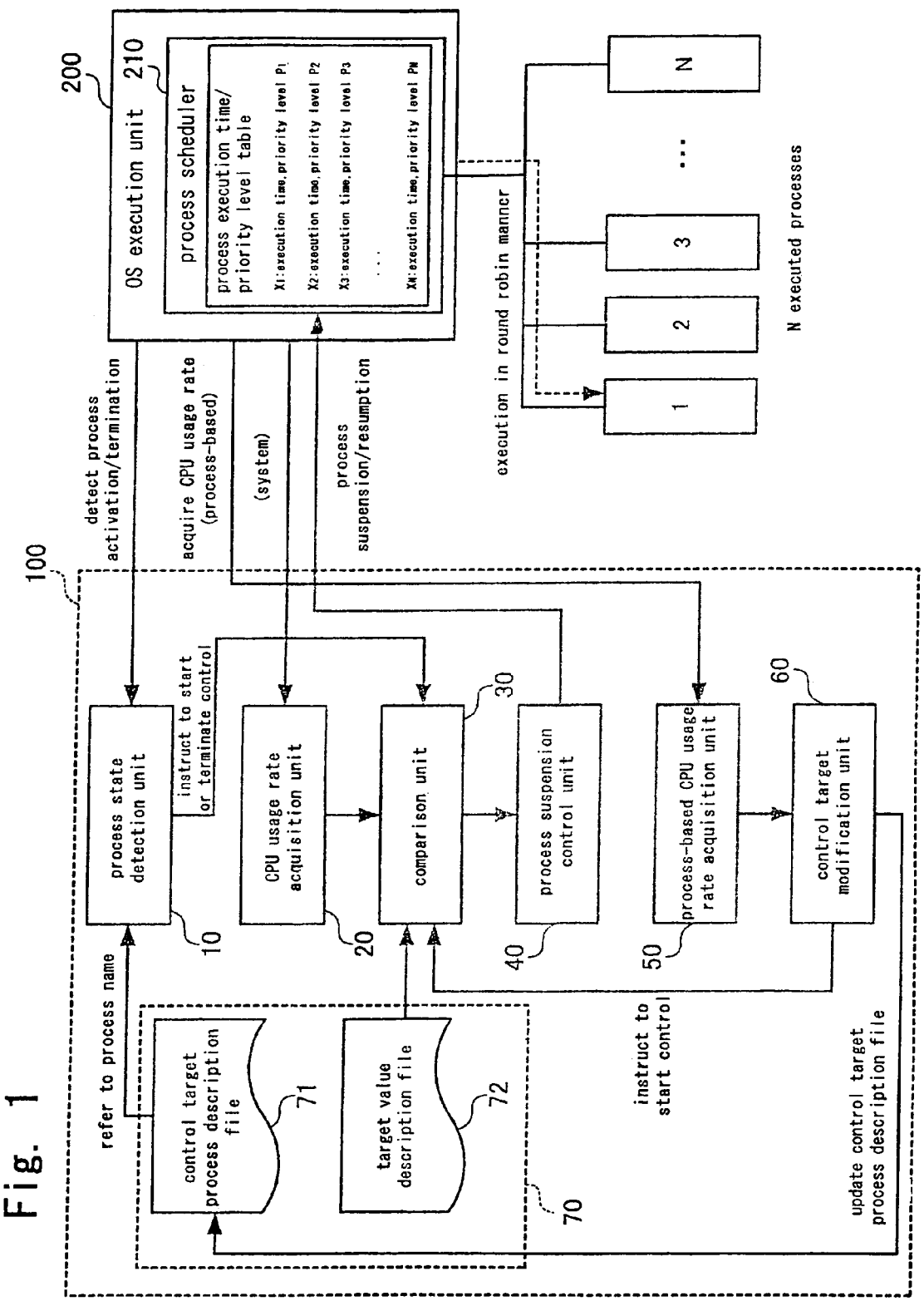
FIG. 1 is a diagram showing a functional configuration of a process control system according to an embodiment of the present invention.

FIG. 1 is a diagram showing a functional configuration of a process control system according to an embodiment of the present invention.

As shown in FIG. 1, a process control system 100 according to this embodiment comprises a process state detection unit 10, a CPU usage rate acquisition unit 20, a comparison unit 30, a process suspension control unit 40, a process-based CPU usage rate acquisition unit 50, and a control target modification unit 60. These functional blocks shown in FIG. 1 are implemented by a program-controlled central processing unit (CPU) and a main memory of a computer.

Furthermore, the process control system 100 according to this embodiment has a data storage unit 70 that stores a control target process description file 71 used by the process state detection unit 10 and a target value description file 72 used by the comparison unit 30. The data storage unit 70 is implemented by a RAM or other memory or a magnetic disk device.

Here, in the control target process description file 71, there is described information that specifies a plurality of control-target processes, the states of which or the states of thread of which are to be switched between suspension and execution. The content of the description is initially externally provided by a user through input manipulations or the like. Once the system starts operating, the content of the description can be dynamically updated depending on the history of the process control.

On the other hand, in the target value description file 72, there is described a target value of the CPU usage rate of the entire system, which provides a criterion for determining whether to suspend or resume a control-target process or a thread thereof. The content of the description is externally provided by a user through input manipulations or the like.

Furthermore, as shown in FIG. 1, on the computer that implements the process control according to this embodiment, an operating system (OS) runs in an OS execution unit 200, and N (one or more) processes are executed under the schedule control of a process scheduler 210 running on the OS. The OS execution unit 200 and the process scheduler 210 control the settings of execution time and priority of the N processes and the execution thereof according to a typical round-robin schedule independently of the process control system 100.

The OS execution unit 200 has a single API or a combination of a plurality of APIs to implement the following functions:

detection of activation and termination of any process;

measurement of the CPU usage rate of the entire system and each process; and suspension and resumption of any process.

The process control system 100 according to this embodiment uses the capability of the API(s) to acquire information required for process control from the OS execution unit 200 and control suspension or resumption of the control-target process.

In the process control system 100 shown in FIG. 1, the process state detection unit 10 detects activation or termination of a predetermined process using a required API of the OS and checks whether the activated process is described in the control target process description file 71 or not. If the process is described in the file (that is, if activation of the control-target process is detected), the process state detection unit 10 instructs the comparison unit 30 to start control. Similarly, if termination of the control-target process is detected, the process state detection unit 10 instructs the comparison unit 30 to terminate control.

When receiving the control start instruction from the process state detection unit 10, the comparison unit 30 reads the target value of the CPU usage rate from the target value description file 72 and requests the current value of the CPU usage rate of the entire system from the CPU usage rate acquisition unit 20.

In response to the request from the comparison unit 30, the CPU usage rate acquisition unit 20 acquires the CPU usage rate of the entire system using a required API of the OS and provides the acquired CPU usage rate to the comparison unit 30.

Once receiving the current value of the CPU usage rate of the entire system from the CPU usage rate acquisition unit 20, the comparison unit 30 compares the acquired current value of the CPU usage rate with the target value read from the target value description file 72. If the current value of the CPU usage rate is greater than the target value, the comparison unit 30 requests the process suspension control unit 40 to suspend the control-target process. On the other hand, if the current value of the CPU usage rate is smaller than the target value, and the control-target process is suspended (that is, the control-target process is stopped after once activated), the comparison unit 30 requests the process suspension control unit 40 to resume the control-target process.

In response to the request from the comparison unit 30, the process suspension control unit 40 controls suspension and execution of the control-target process using a required API of the OS.

Besides the process control sequence described above, the process control system 100 according to this embodiment updates the content of the description of the control target process description file 71 by the process-based CPU usage rate acquisition unit 50 and the control target modification unit 60.

At regular intervals, or in response to an event, such as command input from a user, the control target modification unit 60 requests the CPU usage rates of processes executed by the computer from the process-based CPU usage rate acquisition unit 50.

In response to the request from the control target modification unit 60, the process-based CPU usage rate acquisition unit 50 acquires the process-based CPU usage rates using a required API of the OS execution unit 200 and provides the acquired CPU usage rates to the control target modification unit 60.

Once receiving the information about the process-based CPU usage rates from the process-based CPU usage rate acquisition unit 50, the control target modification unit 60 checks the acquired list of process-based CPU usage rates and checks whether a process of high order (whose CPU usage rate is high) is described in the control target process description file 71 or not. If there is a process whose CPU usage rate is high and which is not described in the control target process description file 71, the process is added to the control target process description file 71. After updating the control target process description file 71, the control target modification unit 60 issues a control start instruction.

Now, a process control operation according to this embodiment will be described.

The process control according to this embodiment is generally composed of a detection processing of a control target (detection of activation and termination of a process) and a control processing thereof (control of suspension and execution of the process). Besides the control operation sequence, modification of the control-target process is carried out. In the following, each of these processings will be described with reference to flowcharts.

First, the detection processing of a control target by the process state detection unit 10 will be described.

As an initial operation, the process state detection unit 10 is initialized and then requests the OS execution unit 200 to start a process activation/termination detection event. Thus, when the OS execution unit 200 detects activation or termination of a predetermined process via an API, the OS execution unit 200 makes a callback to the process state detection unit 10, and the control is shifted to an event detection routine of the process state detection unit 10. This initialization is carried out during the initialization processing at the time of activation of a main program of the process control system according to this embodiment.

Figure 2:
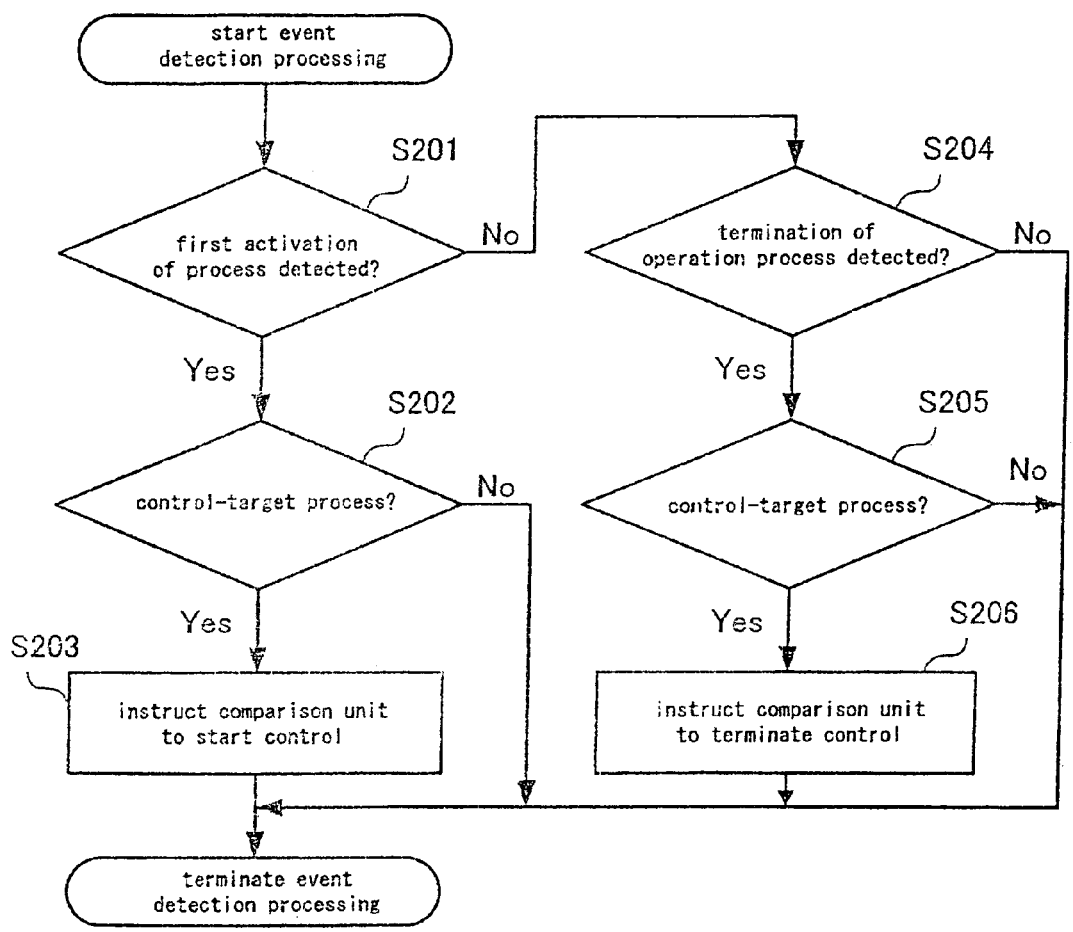
FIG. 2 is a flowchart for illustrating a detection processing of a control target by a process state detection unit according to the embodiment.

FIG. 2 is a flowchart for illustrating the detection processing of a control target by the process state detection unit 10. When the OS execution unit 200 calls the event detection routine of the process state detection unit 10, the event detection processing shown in FIG. 2 is started.

First, the process state detection unit 10 checks whether a detected event is the first activation of a process or not (step 201). If the event is the first activation of a process, the process state detection unit 10 checks whether the activated process is a control-target process or not with reference to the control target process description file 71 (step 202). Then, if the activated process is a control-target process, the process state detection unit 10 instructs the comparison unit 30 to start control, and terminates the event detection processing (step 203). On the other hand, if the activated process is not a control-target process, the process state detection unit 10 terminates the event detection processing without performing any processing (step 202).

If it is determined that the detected event is not the first activation of a process in step 201, it is checked whether the event is termination of an operation process or not (step 204). If the event is termination of an operation process, the process state detection unit 10 checks whether the activated process is a control-target process or not with reference to the control target process description file 71 (step 205). Then, if the activated process is a control-target process, the process state detection unit 10 instructs the comparison unit 30 to terminate control, and terminates the event detection processing (step 206). On the other hand, if the activated process is not a control-target process, the process state detection unit 10 terminates the event detection processing without performing any processing (step 205).

In the case where the OS execution unit 200 cannot serve to detect activation and termination of a process as an event and call the processing routine as in this embodiment, another thread for inquiring the name of a process in operation at regular intervals can be implemented in a part of the system to achieve the event detection and the processing routine call. In this case, each time the thread for inquiring the name of a process in operation compares the process in operation identified by the inquiry with the operation process list updated a certain length of time before and detects the first activation of a predetermined process or termination of an operation process, the process state detection unit 10 calls the event detection routine.

When the event detection processing is terminated, the process state detection unit 10 requests the OS execution unit 200 to terminate the process activation/termination detection event. Once this is done, even if the OS execution unit 200 detects activation or termination of a predetermined process, the control is not shifted to the event detection routine of the process state detection unit 10. This termination is carried out during the termination processing to terminate the main program of the process control system according to this embodiment.

Now, the control processing by the comparison unit 30 and the process suspension control unit 40 will be described.

As an initial operation, the comparison unit 30 and the process suspension control unit 40 are initialized, the comparison unit 30 reads in the control target process description file 71, and a control thread for a process already activated is created. As for a process that has not been activated at the time of initialization, a control thread is created when the process state detection unit 10 issues a control start instruction. Each control thread is an independent thread that does not interfere with any other thread and controls suspension and resumption of the associated process. This initialization is carried out during the initialization processing at the time of activation of the main program of the process control system according to this embodiment.

Figure 3:
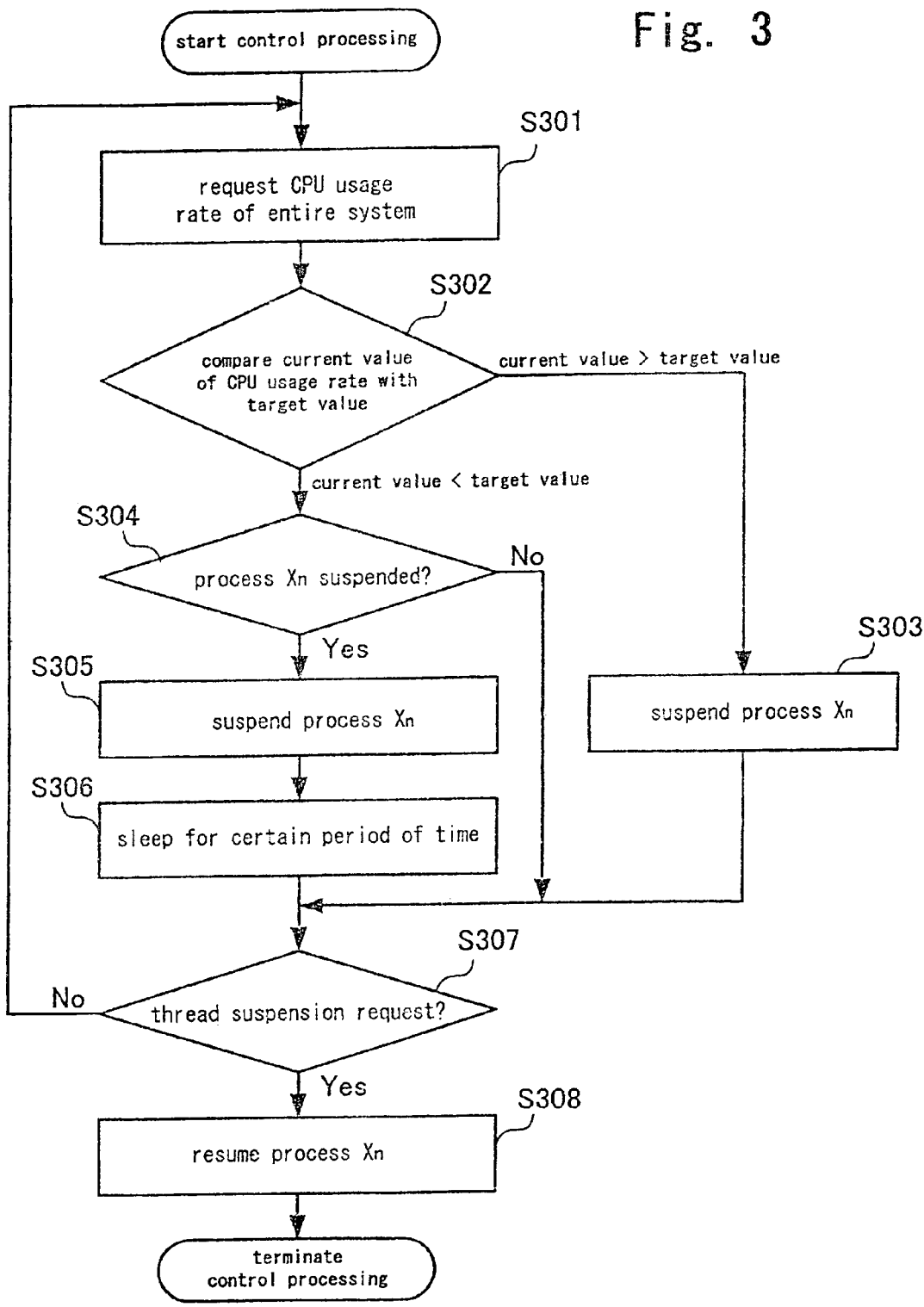
FIG. 3 is a flowchart for illustrating a control processing by a comparison unit and a process suspension control unit according to the embodiment.

FIG. 3 is a flowchart for illustrating a control processing by the comparison unit 30 and the process suspension control unit 40. FIG. 3 shows an operation of a control thread for a single control-target process (denoted as process $X_n$ in this drawing (n: $1 \leq n \leq N$)). In a plurality of control threads that are created for a plurality of control-target processes activated, the operation shown in FIG. 3 is carried out for the control-target process associated with each control thread independently.

In a control thread, the comparison unit 30 first requests the current value of the CPU usage rate of the entire system from the CPU usage rate acquisition unit 20 (step 301). In response to this request, the CPU usage rate acquisition unit 20 acquires the current value of the CPU usage rate of the entire system from the OS execution unit 200 and transfers the acquired value to the comparison unit 30.

When receiving the current value of the CPU usage rate of the entire system from the CPU usage rate acquisition unit 20, the comparison unit 30 checks whether the current value of the CPU usage rate is greater than a predetermined target value or not by referring to the target value description file 72 (step 302). If the current value of the CPU usage rate is greater than the target value, the comparison unit 30 requests the process suspension control unit 40 to suspend the control-target process (process $X_n$). In response to this request, the process suspension control unit 40 makes the OS execution unit 200 suspend the control-target process (process $X_n$) (step 303).

On the other hand, if it is determined in step 302 that the current value of the CPU usage rate is smaller than the target value, the comparison unit 30 then determines whether the control-target process (process $X_n$) is in a suspended state or not (step 304). Then, if the control-target process (process $X_n$) is in a suspended state, the comparison unit 30 requests the process suspension control unit 40 to resume the control-target process (process $X_n$). In response to this request, the process suspension control unit 40 makes the OS execution unit 200 resume the control-target process (process $X_n$) (step 305). If it is determined in step 304 that the control-target process (process Xn) is not in a suspended state (in other words, in operation), the comparison unit 30 issues no request to the process suspension control unit 40.

After the determination operations by the comparison unit 30 and the control operations by the process suspension control unit 40 in steps 302 to 305, the comparison unit 30 is kept in a sleep state for a certain period of time (step 306). Then, after activated again, if there is no request for suspension of a thread thereof (described later), the control processing returns to step 301 and is repeated (step 307). On the other hand, in the case where there is a request for suspension of a thread thereof, if the control-target process (process $X_n$) controlled by the thread is in a suspended state, the process is resumed to terminate the control processing (steps 307 and 308).

The control thread for which the operation described above is carried out is terminated when the process state detection unit 10 issues a control termination instruction. Once a control termination instruction for a predetermined control-target process is issued, when the comparison unit 30 is activated again from the sleep state in the above described step 306 in the relevant control thread, the comparison unit 30 accepts the control termination instruction as a suspension request for the control thread and terminates the control thread in the procedure described above.

In the case where the termination processing to terminate the main program of the process control system according to this embodiment is carried out, a suspension request for all the control threads is issued in the termination processing. When the comparison unit 30 is activated again from the sleep state in the above described step 306 in each control thread, the comparison unit 30 terminates the control thread with the above described procedure in accordance with the suspension request.

Here, a concept of the process control according to this embodiment implemented in the above-described manner will be described.

Figure 4:
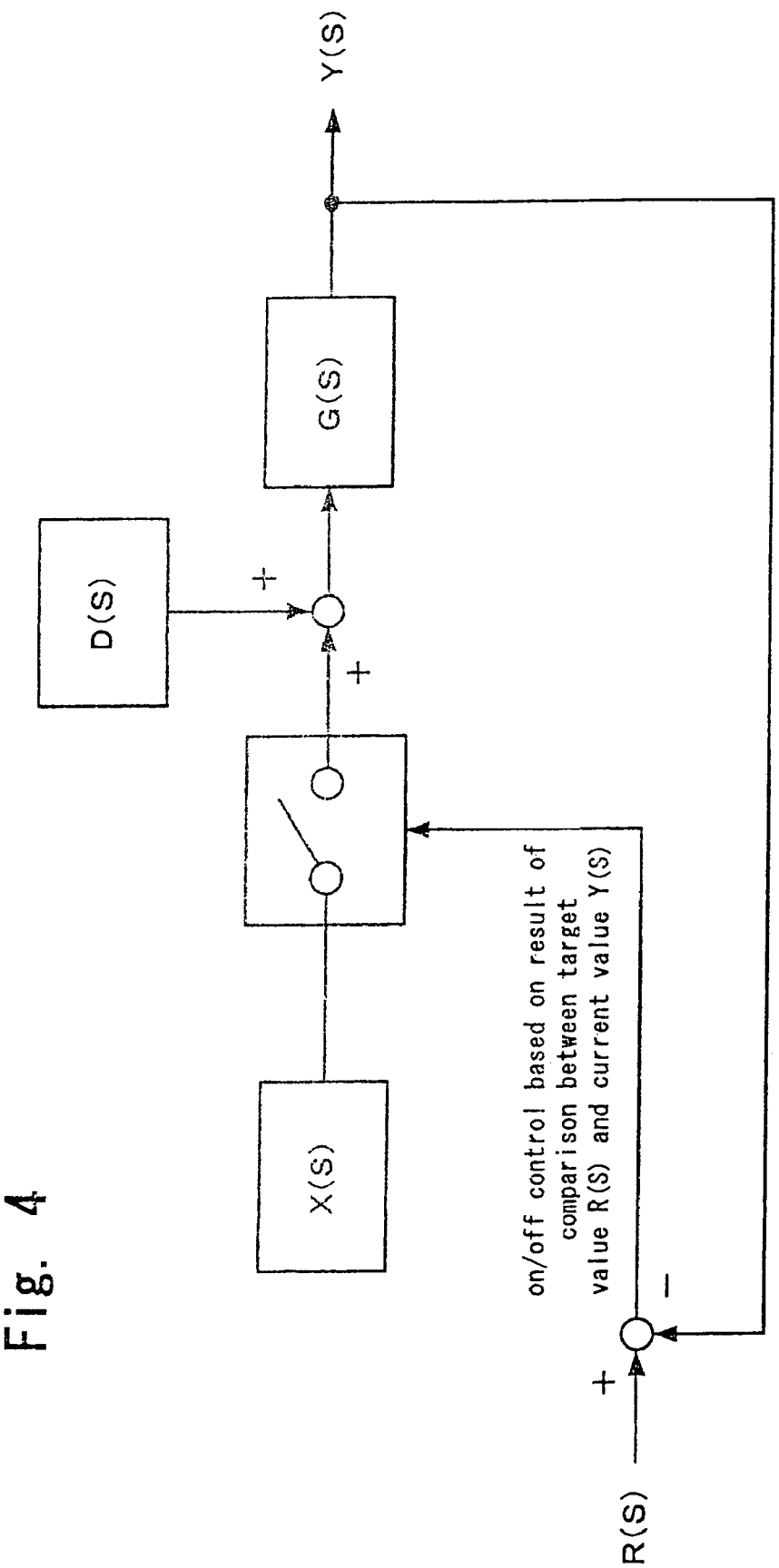
FIG. 4 is a diagram for illustrating a basic concept of a process control according to the embodiment.

FIG. 4 is a diagram for illustrating a basic concept of the process control according to this embodiment. In FIG. 4, reference character Y(S) denotes the CPU usage rate of the entire system (current value), reference character X(S) denotes the CPU usage rate of a control-target process X (current value), and reference character D(S) denotes the sum of CPU usage rates of processes not to be controlled (referred to as non-target processes, hereinafter) (current value). In addition, reference character G(S) denotes a correlation function (transfer function) that represents the effect on the CPU usage rate of the entire system, and reference character R(S) denotes a target value of the CPU usage rate of the entire system.

Supposing that the user mode time of an idle process is denoted by $U_i$, the kernel mode time of the idle process is denoted by $K_i$, and the elapsed time is denoted by $E_t$, the CPU usage rate Y(S) of the entire system can be calculated as follows:

$$Y(S)=(1-(U_i+K_i)/E_t)\times 100\%$$

Supposing that the user mode time of a control-target process X by $U_x$, the kernel mode time of the control-target process X by $K_x$, the CPU usage rate X(S) of the control-target process X can be calculated as follows:

$$X(S)=(U_x+K_x)/E_t\times 100\%$$

However, according to this embodiment, X(S) does not need to be calculated, and the control-target process X can be controlled to suspend and resume only based on the comparison between the calculation result of Y(S) and the value R(S).

As shown in FIG. 4, when the control-target process X is in operation, the CPU usage rate Y(S) of the entire system is expressed as:

$$Y(S)=G(S)\times(X(S)+D(S)).$$

When the relation between Y(S) and R(S) becomes:

$$Y(S)>R(S),$$

the control-target process X is suspended (the switch shown in FIG. 4 is turned off), resulting in:

$$X(S)=0.$$

At this time, the CPU usage rate Y(S) of the entire system is expressed as:

$$Y(S)=G(S)\times D(S).$$

Because the control-target process X is suspended, the CPU usage rate Y(S) of the entire system gradually decreases, and after a certain elapsed time, the relation between Y(S) and R(S) becomes:

$$Y(S)<R(S).$$

After the CPU usage rate Y(S) of the entire system has decreased, the control-target process X is resumed (the switch shown in FIG. 4 is turned on), and the CPU usage rate Y(S) of the entire system becomes again:

$$Y(S)=G(S)\times(X(S)+D(S)).$$

Then, the CPU usage rate Y(S) of the entire system increases, and when the CPU usage rate Y(S) becomes greater than the target value R(S), the feedback described above is carried out.

The control-target process X may not be immediately resumed when the CPU usage rate Y(S) of the entire system becomes smaller than the target value R(S) of the CPU usage rate, but the control-target process may be controlled with a certain hysteresis. For example, in the case where the target value R(S) is set at 30%, the control which makes the control-target process X resume when the CPU usage rate Y(S) of the entire system decreases to 10%, which is 20% lower than the target value R(S) is possible. Alternatively, two kinds of target values, including an upper limit value and a lower limit value, may be previously determined, and the control which makes the control-target process X suspend when the CPU usage rate Y(S) of the entire system becomes greater than the upper limit value and be resumed when the CPU usage rate Y(S) of the entire system becomes smaller than the lower limit value is also possible. In the example described above, the simplest control example, which involves only one control-target process, has been described for ease of understanding of the basic concept of the process control according to this embodiment. In the actual system, however, a plurality of processes may be selected as control-target processes, for which the process control according to this embodiment may be carried out.

Figure 5:
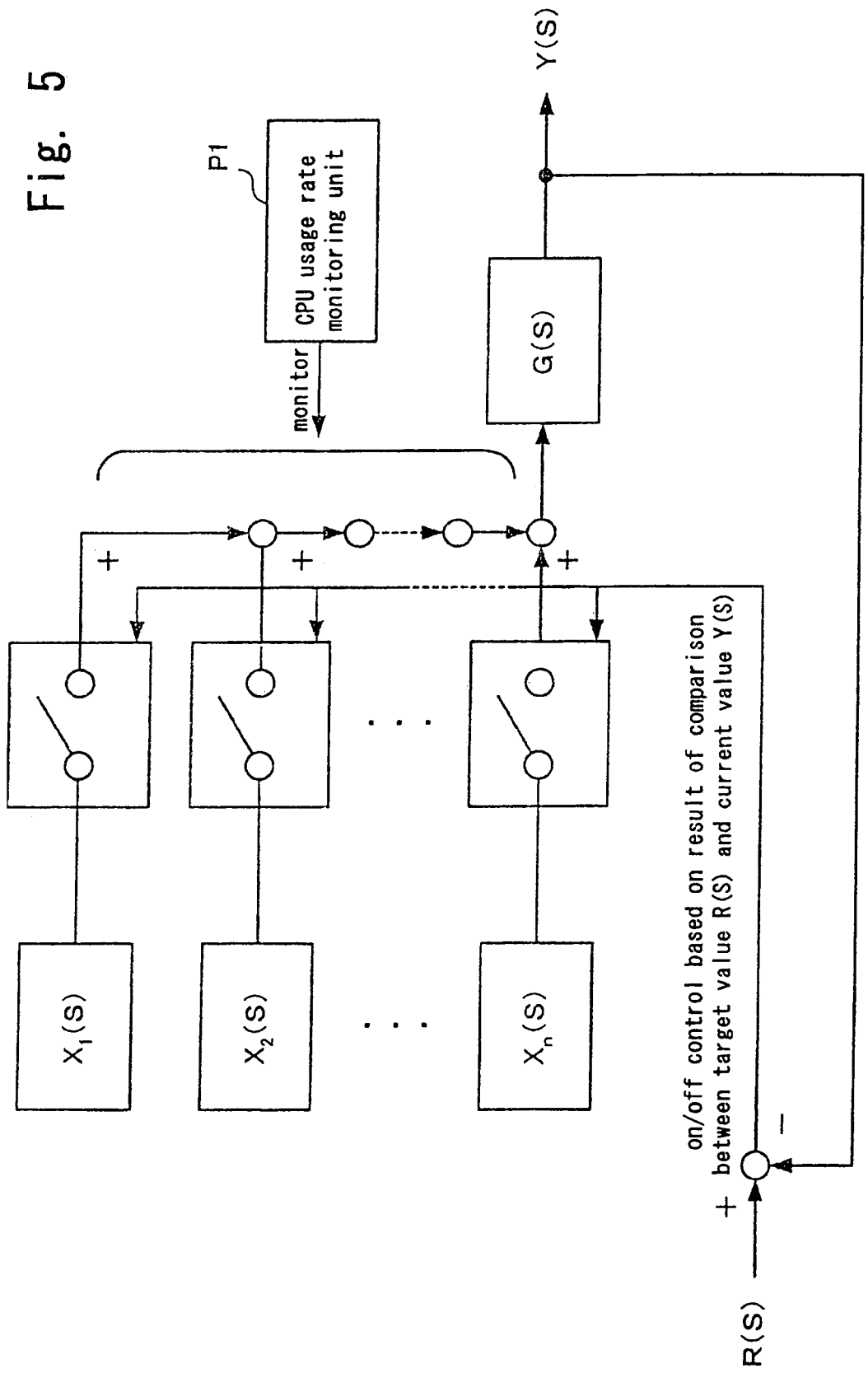
FIG. 5 is a diagram for illustrating a concept of the process control according to the embodiment which involves a plurality of control-target processes.

FIG. 5 is a diagram for illustrating a concept of the process control according to this embodiment in the case where a plurality of control-target processes are involved. In FIG. 5, N control-target processes are set, and the CPU usage rate (current value) of each control-target process $X_n$ (n: $1\leq n\leq N$) is denoted as $X_n(S)$. As the control-target processes $X_n$, for example, a CPU usage rate monitoring unit P1 may monitor the CPU usage rate of each process, and the top N processes in descending order of CPU usage rate may be selected. The function of the CPU usage rate monitoring unit P1 can be implemented by an existing CPU usage rate monitoring program that controls the CPU of the computer. Reference characters Y(S), G(S) and R(S) in this drawing are the same as those shown in FIG. 4. While the sum of the CPU usage rates of any non-target processes is not shown as D(S) in FIG. 5, in the case where the number of operating processes is N or more, any process other than the top N processes in descending order of CPU usage rate is regarded as a non-target process, and the sum of the CPU usage rates as D(S) is taken into consideration.

In FIG. 5, supposing that the user mode time of the control-target process $X_n$ is denoted by $U_{xn}$, and the kernel mode time of the control-target process $X_n$ is denoted by $K_{xn}$, the processor usage rate $X_n(S)$ of each control-target process $X_n$ can be calculated as follows:

$$X_n(S)=(U_{xn}+K_{xn})/E_t\times 100\%.$$

This calculation is performed by the CPU usage rate monitoring unit P1. Here, reference character $E_t$ denotes the elapsed time. In addition, the CPU usage rate Y(S) of the entire system can be calculated in the same manner as in the case shown in FIG. 4.

In the case where a plurality of control-target processes are set as shown in FIG. 5, as in the case shown in FIG. 4, all the N control-target processes $X_n$, excluding any non-target processes, can be simultaneously suspended or resumed (the switches shown in FIG. 5 can be simultaneously turned on or off). Alternatively, each control-target process $X_n$ can be separately controlled, and at least some of the N control-target processes $X_n$ can be specified as control targets. In this case, for example, the CPU usage rate monitoring unit P1 monitors the CPU usage rate of each control-target process $X_n$ at regular intervals. Then, if the CPU usage rate Y(S) of the entire system becomes greater than the target value R(S), the top several control-target processes Xn in descending order of CPU usage rate can be suspended. The number of the control-target processes Xn to be suspended and the specific control method can be arbitrarily chosen. For example, based on the comparison between the CPU usage rate Y(S) and the target value R(S), the number of control-target processes $X_n$ to be suspended can be successively increased by a predetermined fixed number. Alternatively, based on how far the CPU usage rate Y(S) exceeds the target value R(S), the number of control-target processes $X_n$ to be suspended can be calculated and dynamically determined.

Alternatively, instead of simply selecting the top several control-target processes $X_n$ in descending order of CPU usage rate, the covariance of the CPU usage rate $X_n(S)$ of each control-target process $X_n$ and the CPU usage rate Y(S) of the entire system over a certain period of time can be calculated, and a control-target process $X_n$ that exhibits a high positive correlation can be selected for suspension/resumption control.

Furthermore, instead of simply comparing the CPU usage rate Y(S) of the entire system with the target value R(S) as shown in the examples in FIGS. 4 and 5, a multiple regression analysis can be performed for time-series data about the CPU usage rate X(S) or Xn(S) and the CPU usage rate Y(S) over a certain period of time up to the current time, the calculated prediction value $Y_f(S)$ of the CPU usage rate of the entire system can be compared with the target value R(S), and the process control can be carried out based on the comparison result. By controlling the control-target process X or control-target processes $X_n$ using the prediction value $Y_f(S)$ of the CPU usage rate of the entire system calculated by the multiple regression analysis, the processor usage rate of the entire system can be controlled without an abrupt and significant change.

Figure 6:
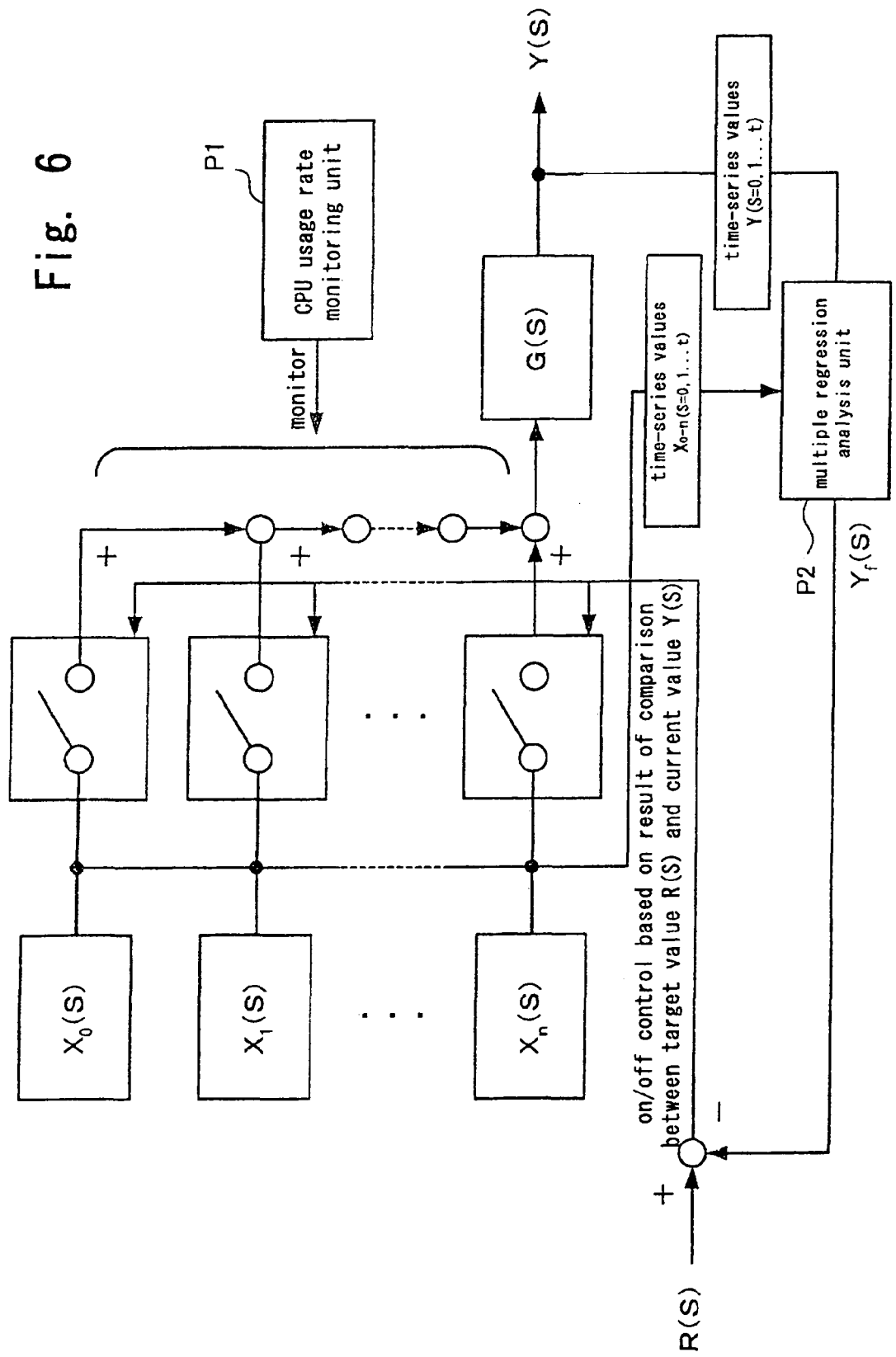
FIG. 6 is a diagram for illustrating a concept of the process control according to the embodiment which is based on a prediction value of the CPU usage rate of the entire system.

FIG. 6 is a diagram for illustrating a concept of the process control based on the prediction value of the CPU usage rate of the entire system.

In the example shown in FIG. 6, a multiple regression analysis unit P2 is inserted in a feedback loop for controlling the control-target process $X_n$ based on the CPU usage rate Y(S) of the entire system. The function of the multiple regression analysis unit P2 can be implemented by an existing multiple regression analysis program that controls the CPU of the computer. The multiple regression analysis unit P2 input the CPU usage rate Y(S) of the entire system and the CPU usage rate $X_n(S)$ of each control-target process $X_n$ and calculates the prediction value $Y_f(S)$ of the CPU usage rate of the entire system by multiple regression analysis. Then, based on the result of comparison between the prediction value $Y_f(S)$ of the CPU usage rate of the entire system and the target value R(S), the control-target process X or control-target processes $X_n$ are suspended or resumed. If the calculation of the prediction value by multiple regression analysis has a significant effect on the CPU usage rate of the system to be controlled, only the calculation of the prediction value may be performed in another system. Now, a modification processing of a control-target process by the process-based CPU usage rate acquisition unit 50 and the control target modification unit 60 will be described.

As described above, besides the process control sequence described above, the process control system according to this embodiment checks the CPU usage rates of processes executed in the computer at regular intervals and modifies a control-target process. In this processing, it is checked whether the processes are described in the control-target description file or not in descending order of CPU usage rate, and if there is a process that is not described, the control-target description file is updated.

As an initial operation, the process-based CPU usage rate acquisition unit 50 and the control target modification unit 60 are initialized, and a thread for modification of a control-target process is created. This initialization is carried out during the initialization processing at the time of activation of the main program of the process control system according to this embodiment.

Figure 7:
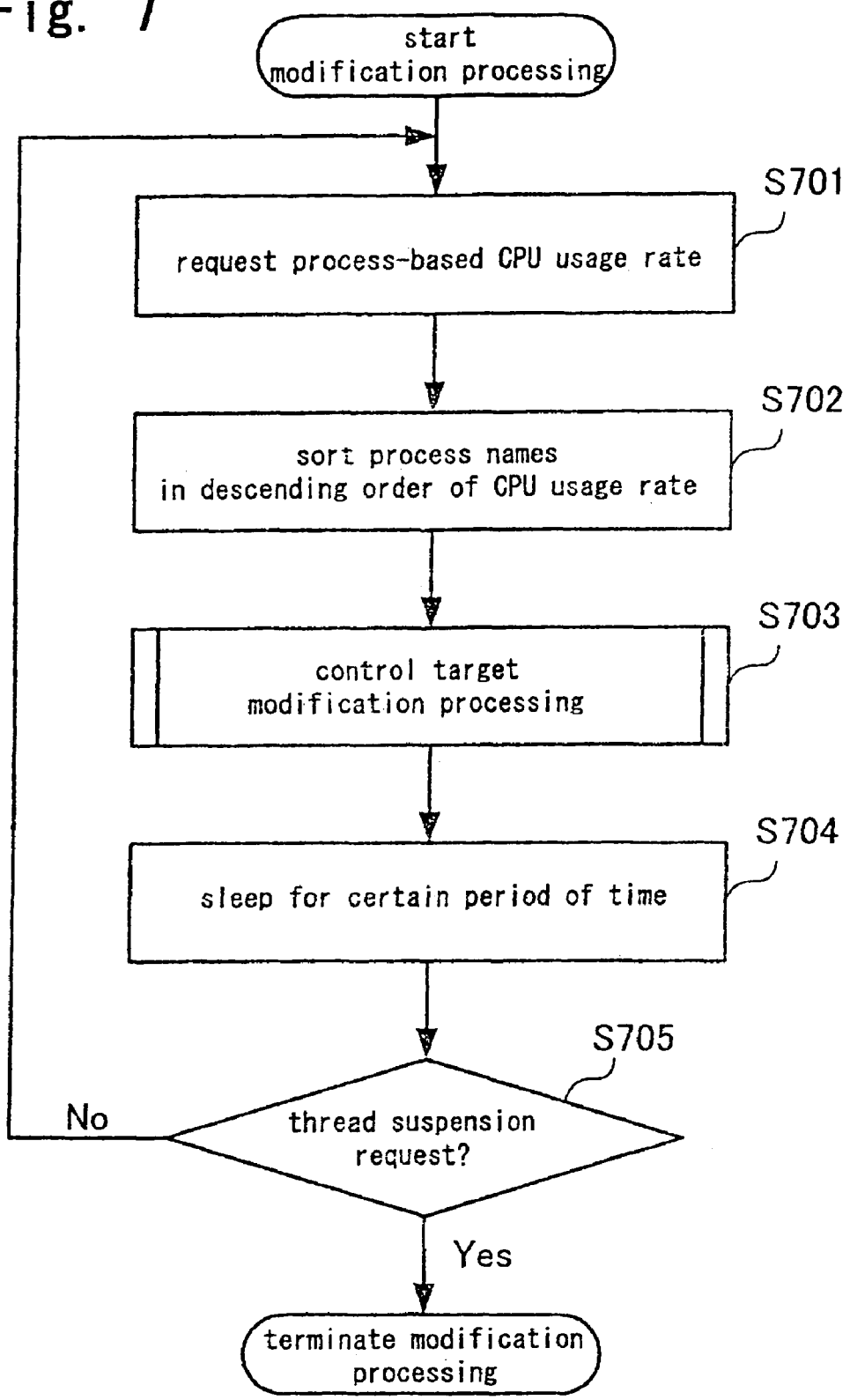
FIG. 7 is a flowchart for illustrating a modification processing of a control-target process by a process-based CPU usage rate acquisition unit and a control target modification unit according to the embodiment.

FIG. 7 is a flowchart for illustrating a modification processing of a control-target process by the process-based CPU usage rate acquisition unit 50 and the control target modification unit 60.

In the thread for modification of the control-target process, the control target modification unit 60 requests the acquisition of the process-based CPU usage rates from the process-based CPU usage rate acquisition unit 50 at regular intervals (step 701). In response to this request, the process-based CPU usage rate acquisition unit 50 acquires information about the process-based CPU usage rates of the processes in operation from the OS execution unit 200 and transfers the acquired process-based CPU usage rates to the control target modification unit 60. When receiving the information about the process-based CPU usage rates from the process-based CPU usage rate acquisition unit 50, the control target modification unit 60 sorts the names of the processes in descending order of CPU usage rate (step 702) and executes a control target modification processing (step 703). Details of the control target modification processing will be described later.

After the modification processing is completed, the control target modification unit 60 is kept in a sleep state for a certain period of time (step 704). Then, after activated again, if there is no request for suspension of a thread thereof (described later), the modification processing returns to step 701, the control target modification unit 60 issues the request to the process-based CPU usage rate acquisition unit 50, and the modification processing is repeated (step 705). On the other hand, if there is a request for suspension of a thread thereof, the modification processing is terminated (step 705).

In the case where the termination processing to terminate the main program of the process control system according to this embodiment is carried out, a suspension request for the thread for modification of the control-target process is issued in the termination processing. When the control-target modification unit 60 is activated again from the sleep state in the above described step 704, the control-target modification unit 60 terminates the control thread in accordance with the suspension request.

Figure 8:
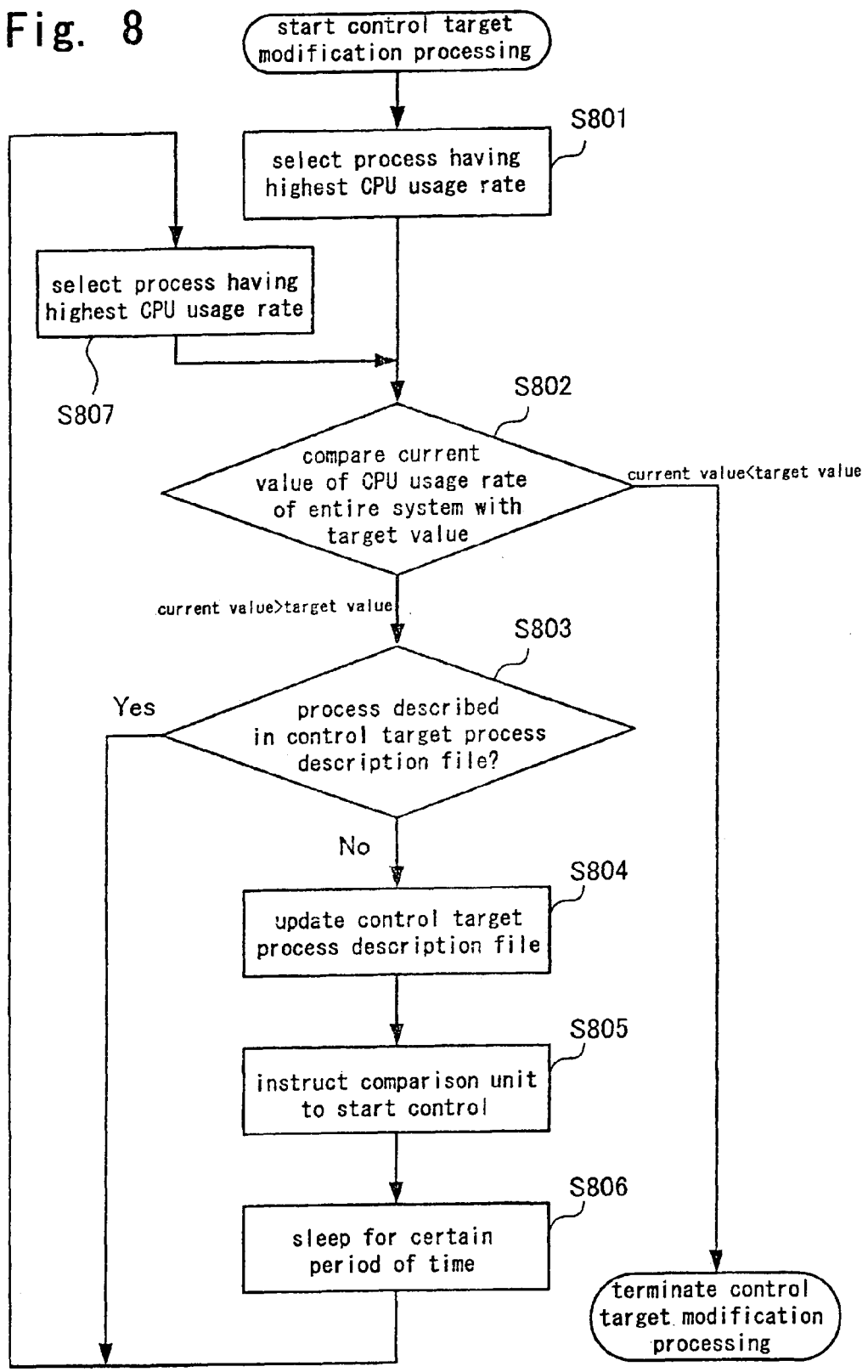
FIG. 8 is a flowchart for illustrating details of a control target modification processing shown in FIG. 7.

FIG. 8 is a flowchart for illustrating details of the control target modification processing shown in FIG. 7.

First, based on the list of the process names sorted in step 702, the control target modification unit 60 selects a process that has the highest CPU usage rate (step 801) and compares the current value of the CPU usage rate of the selected process with the target value described in the target value description file 72 (step 802). Then, if the CPU usage rate of the selected process is smaller than the target value, the control target modification processing is terminated without any processing.

On the other hand, if the CPU usage rate of the selected process is greater than the target value, the control target modification unit 60 then checks whether the process is described in the control target process description file 71 or not (step 803). Then, if the process is not described in the control target process description file 71, the control target modification unit 60 updates the content of the control target process description file 71 by adding the process as a control-target process (step 804). Then, the control target modification unit 60 instructs the comparison unit 30 to start control (step 805) and then is kept in a sleep state for a certain period of time (step 806).

If it is determined in step 803 that the selected process is described in the control target process description file 71, or after the control target modification unit 60 is activated again from the sleep state, the control target modification unit 60 selects a process that has the next highest CPU usage rate based on the list of the process names sorted in step 702 (step 807) and then repeats the procedure from step 802.

As described earlier with reference to FIGS. 2 and 3, the comparison unit 30 performs the process control according to this embodiment for a previously determined control-target process. Thus, even if a process has a high CPU usage rate, if the process is not described in the control target process description file 71, the process is not subjected to the suspension/resumption control. However, since it is checked whether a process having a high CPU usage rate is described in the control target process description file 71 or not and the process is added to the control target process description file 71 if the process is not described in the file as described above, the process having a high CPU usage rate can always be a control target. In addition, since the comparison unit 30 is informed of any process added as a control-target process and immediately is made to perform the process control according to this embodiment, the CPU usage rate of the entire system can be quickly reduced to approach the target value of the CPU usage rate of the entire system. When a control-target process is added in step 804, the control-target process having the lowest CPU usage rate among the control-target processes described in the control target process description file 71 may be deleted from the control target process description file 71 in order to keep the number of control-target processes constant.

As described above, according to this embodiment, the CPU usage rate of the entire system is fed back, so that the suspension/resumption control can be heuristically performed beginning with the process that has the highest CPU usage rate (or in other words, that has the highest effect on the CPU usage rate of the entire system). That is, the suspension time, execution time, priority level or the like of each program (process) in operation does not need to be calculated from the CPU usage rate, and the possibility that the execution time and suspension time of a process once calculated has to be calculated again because of an unexpected activation of a process is eliminated. Thus, a process can be quickly controlled in response to the actual activation thereof or actual execution state thereof.

According to this embodiment, regardless of the type of the program that is to be newly executed, the suspension/resumption control can be performed beginning with the program that merely has the highest CPU usage rate. That is, even in a system that cannot specify when the program is to be activated or which program is to be activated, the external effect of activation of a new program or the like can be quickly eliminated.

While the particular PROCESS CONTROL SYSTEM AND CONTROL METHOD THEREFOR is herein shown and described in detail, it is to be understood that the subject matter which is encompassed by the present invention is limited only by the claims.

What is claimed is:

1. A process control system including a processor, comprising:
    a process state detection unit that detects activation of a process in a computer and determines whether the process is a previously determined one of control-target processes;
    a comparison unit that calculates a prediction value of the CPU usage rate of the entire system by performing a multiple regression analysis on time-series data over a certain period of time about the CPU usage rate of the entire system and the CPU usage rate of each process and compares the prediction value with a target value; and
    a process suspension control unit that controls suspension and resumption of said control-target process based on the result of comparison by said comparison unit, wherein an upper limit value and a lower limit value are set as said target value of the CPU usage rate of the entire system, and said process suspension control unit suspends said control-target process if said comparison unit determines that said prediction value is greater than said target value, and resumes execution of the control-target process if said comparison unit determines that the prediction value is smaller than said target value and said control-target process is suspended.

2. The process control system according to claim 1, wherein said process suspension control unit suspends said control-target process if said comparison unit determines that the current value of the CPU usage rate of the entire system is greater than said target value, and resumes execution of the control-target process if said comparison unit determines that the current value is smaller than said target value and said control-target process is suspended.

3. The process control system according to claim 1, wherein if said comparison unit determines that the current value of the CPU usage rate of the entire system is greater than said target value, and there are a plurality of control-target processes in operation, said comparison unit determines at least some of the control-target processes in operation as targets for suspension, and said process suspension control unit suspends said control-target processes in operation that are determined as targets for suspension by said comparison unit.

4. The process control system according to claim 1, further comprising a control target process description file that describes the control-target processes, wherein said process state detection unit checks whether said process whose activation is detected is described in said control target process description file to determine whether the process is said one of control-target processes.

5. The process control system according to claim 4, further comprising a control target modification unit that acquires the process-based CPU usage rate of each process in operation, checks whether a predetermined process identified based on the process-based CPU usage rate is described in said control target process description file, and adds the predetermined process to the control target process description file if the predetermined process is not described in the control target process description file.

6. A computer including a processor, comprising:
an operating system (OS) execution unit that controls the execution of a plurality of processes in accordance with an OS;
a process state detection unit that detects activation of a process under the control of said OS execution unit and determines whether the process is a previously determined one of control-target processes;
a comparison unit that, if said process state detection unit determines that said control-target process is activated, acquires a current value of the CPU usage rate of the entire system from said OS execution unit and compares the current CPU usage rate with a previously determined target value of the CPU usage rate of the entire system; and
a process suspension control unit that instructs said OS execution unit to suspend or resume said control-target process based on the result of comparison by said comparison unit, wherein an upper limit value and a lower limit value are set as said target value of the CPU usage rate of the entire system, and said process suspension control unit suspends said control-target process if said comparison unit determines that the current value of the CPU usage rate of the entire system is greater than said upper limit value, and resumes execution of the control-target process if said comparison unit determines that the current value is smaller than said lower limit value and said control-target process is suspended, the current value being established by a prediction value of the CPU usage rate of the system, the prediction value of the CPU usage rate of the system being calculated by performing a multiple regression analysis on time-series data over a period of time using one or more usage rates of the system.

7. The computer according to claim 6, further comprising a control target modification unit that acquires the process-based CPU usage rate of each process in operation from said OS execution unit and modifies said control-target process based on the process-based CPU usage rate.

8. A method of controlling a process executed by a computer, comprising:
detecting activation of a process in the computer and determining whether the process is a previously determined one of control-target processes;
acquiring the CPU usage rate of the entire system if said process state detection unit determines that said control-target process is activated, the CPU usage rate being acquired by determining a prediction value of the CPU usage rate of the entire system calculated by performing a multiple regression analysis on time-series data over a certain period of time about the CPU usage rate of the entire system and the CPU usage rate of each process;
comparing the acquired CPU usage rate of the entire system with a previously determined target value of the CPU usage rate of the entire system;
suspending said control-target process if said CPU usage rate of the entire system is greater than said target value; and
resuming execution of the control-target process if said CPU usage rate of the entire system is smaller than said target value and said control-target process is suspended.

9. The method according to claim 8, wherein, in the comparison between said CPU usage rate of the entire system and said target value, the current value of the CPU usage rate of the entire system is compared with the target value.

10. The method according to claim 8, further comprising: acquiring the process-based CPU usage rate of each process in operation; and modifying said control-target process based on the acquired process-based CPU usage rate.

11. A computer-implemented system comprising:
process state detection means that detects activation of a process in a computer and determines whether the process is a previously determined one of control-target processes;
comparison means that, if said process state detection means determines that said control-target process is activated, acquires the CPU usage rate of the entire system and compares the acquired CPU usage rate with a previously determined target value of the CPU usage rate of the entire system; and
process suspension control means that controls suspension and resumption of said control-target process based on the result of comparison by said comparison means, wherein said comparison means calculates a prediction value of the CPU usage rate of the entire system by performing a multiple regression analysis on time-series data over a certain period of time about the CPU usage rate of the entire system and the CPU usage rate of each process and compare the prediction value with said target value, and
said process suspension control means suspends said control-target process if it is determined that said prediction value is greater than said target value, and resumes execution of the control-target process if it is determined that the prediction value is smaller than said target value and said control-target process is suspended.

12. The system according to claim 11, wherein said process suspension control means suspends said control-target processes if it is determined that the current value of the CPU usage rate of the entire system is greater than said target value, and resumes execution of the control-target process if it is determined that the current value is smaller than said target value and said control-target process is suspended.

13. The system according to claim 11, comprising control target modification means that acquires the process-based CPU usage rate of each process in operation and modifies said control-target process based on the process-based CPU usage rate.

14. A computer including a processor and a computer readable storage medium, the computer readable storage medium storing logic, when executed by the processor, causing the processor to undertake computer processing comprising:
detecting activation of a process in the computer and determining whether the process is a previously determined one of control-target processes;
acquiring the CPU usage rate of the entire system if said process state detection unit determines that said control-target process is activated,
comparing the acquired CPU usage rate of the entire system with a previously determined target value of the CPU usage rate of the entire system;
suspending said control-target process if said CPU usage rate of the entire system is greater than said target value;
resuming execution of the control-target process if said CPU usage rate of the entire system is smaller than said target value and said control-target process is suspended wherein an upper limit value and a lower limit value are set as said target value and the logic further comprises:

suspending the control-target process responsive to a determination that the current value of the CPU usage rate of the entire system is greater than said upper limit value; and resuming execution of the control-target process responsive to a determination that that the current value is smaller than said lower limit value and said control-target process is suspended;

calculating a prediction value of the CPU usage rate of the entire system by performing a multiple regression analysis on time-series data over a certain period of time about the CPU usage rate of the entire system and the CPU usage rate of each process;

comparing the prediction value with said target value;

suspending the control-target process responsive to a determination that said prediction value is greater than said target value; and resuming execution of the control-target process responsive to a determination that the prediction value is smaller than said target value and said control-target process is suspended.

* * * * *